United States Patent
Freund et al.

(10) Patent No.: US 10,680,901 B2
(45) Date of Patent: Jun. 9, 2020

(54) CONFIGURATION MANAGEMENT IN A MULTISYSTEM ENVIRONMENT

(71) Applicant: SAP SE, Walldorf (DE)

(72) Inventors: Barbara Freund, Heidelberg (DE); Andre Klahre, Schwetzingen (DE); Nicolai Jordt, Bad Schoenborn (DE)

(73) Assignee: SAP SE, Walldorf (DE)

( * ) Notice: Subject to any disclaimer, the term of this patent is extended or adjusted under 35 U.S.C. 154(b) by 225 days.

(21) Appl. No.: 15/794,954

(22) Filed: Oct. 26, 2017

(65) Prior Publication Data
US 2019/0132212 A1   May 2, 2019

(51) Int. Cl.
| | |
|---|---|
| G06F 11/36 | (2006.01) |
| H04L 12/24 | (2006.01) |
| H04L 29/08 | (2006.01) |
| G06F 8/60 | (2018.01) |
| H04L 12/26 | (2006.01) |

(52) U.S. Cl.
CPC ........ H04L 41/145 (2013.01); G06F 11/3672 (2013.01); H04L 41/0846 (2013.01); H04L 41/0866 (2013.01); G06F 8/60 (2013.01); G06F 11/3664 (2013.01); G06F 11/3668 (2013.01); G06F 11/3696 (2013.01); H04L 43/50 (2013.01); H04L 67/10 (2013.01)

(58) Field of Classification Search
None
See application file for complete search history.

(56) References Cited

U.S. PATENT DOCUMENTS

| | | | |
|---|---|---|---|
| 7,650,609 B2 | 1/2010 | Klevenz et al. | |
| 7,657,609 B2 | 2/2010 | Klevenz et al. | |
| 7,885,847 B2 | 2/2011 | Wodtke et al. | |
| 7,979,296 B2 | 7/2011 | Kruse et al. | |
| 8,656,414 B1 | 2/2014 | Walter et al. | |
| 9,009,736 B2 | 4/2015 | Walter et al. | |

(Continued)

OTHER PUBLICATIONS

"Configuration Management (LO-CM)," SAP Documentation, available at: https://help.sap.com/erp2005_ehp_05/helpdata/en/ce/c3b65334e6b54ce10000000a174cb4/frameset.htm, 2 pages, retrieved on or before Oct. 16, 2017.

(Continued)

Primary Examiner — Tom Y Chang
(74) Attorney, Agent, or Firm — Klarquist Sparkman, LLP

(57) ABSTRACT

Configuration setting management is facilitated by setting data in a multisystem environment. A system having a configuration setting, in a multisystem environment having a test system and a production system, may identify the type for the setting based on a type identifier. The system may maintain the setting based on the type. Maintaining the setting may include, for a first type, making a primary location for the setting the production system, where the setting is initialized and editable in the production system. Maintaining the setting may include, for a second type, making the setting independent between the test system and the production system, where the setting is not transferred between the two systems and is editable at each system. Maintaining the setting may include, for a third type, making a primary location for the setting the test system, where the setting is initialized and editable in the test system.

20 Claims, 16 Drawing Sheets

(56) References Cited

U.S. PATENT DOCUMENTS

| | | | |
|---|---|---|---|
| 9,436,724 B2 | 9/2016 | Driesen et al. | |
| 9,471,659 B2 | 10/2016 | Driesen et al. | |
| 9,582,562 B2 | 2/2017 | Driesen et al. | |
| 9,639,448 B2 | 5/2017 | Gebhard et al. | |
| 2005/0027585 A1 | 2/2005 | Wodtke et al. | |
| 2005/0033626 A1 | 2/2005 | Kruse et al. | |
| 2007/0011274 A1 | 1/2007 | Klevenz et al. | |
| 2007/0011275 A1 | 1/2007 | Klevenz et al. | |
| 2010/0088281 A1* | 4/2010 | Driesen | G06F 8/65 707/641 |
| 2013/0117710 A1 | 5/2013 | Walter et al. | |
| 2013/0238555 A1 | 9/2013 | Driesen et al. | |
| 2013/0238577 A1 | 9/2013 | Driesen et al. | |
| 2013/0238868 A1 | 9/2013 | Driesen et al. | |
| 2014/0033232 A1 | 1/2014 | Walter et al. | |
| 2014/0033233 A1 | 1/2014 | Walter et al. | |
| 2014/0359261 A1* | 12/2014 | Collins | G06F 8/60 713/1 |
| 2015/0007159 A1 | 1/2015 | Gebhard et al. | |
| 2015/0112923 A1 | 4/2015 | Driesen et al. | |
| 2016/0103857 A1 | 4/2016 | Kientz et al. | |
| 2016/0132899 A1 | 5/2016 | Mester et al. | |
| 2016/0217202 A1 | 7/2016 | Klahre et al. | |

OTHER PUBLICATIONS

"How to Create Financial Statement Versions (FSV) in SAP," available at: https://www.saponlinetutorials.com/create-financial-statement-versions-fsv-sap/, 8 pages, retrieved on or before Oct. 18, 2017.

Nikbakht-Tehrani, "What does the flag Current Settings mean?" SAP Community Wiki, available at: https://wiki.scn.sap.com/wiki/display/ABAP/Current+Settings, 1 page (Jul. 7, 2015).

"SAP Solution Manager," Wikipedia, available at: https://en.wikipedia.org/wiki/SAP_Solution_Manager, 5 pages, retrieved on or before Oct. 16, 2017.

Snapp, "The Logic of Planned Orders and Purchase Requisitions," Brightwork Research & Analysis, available at: http://www.scmfocus.com/sapplanning/2012/08/08/the-logic-of-planned-orders-and-purchase-requisitions/, 7 pages (Aug. 8, 2012).

Stevens, "Setting up a CTS+ enabled transport landscape in SAP Cloud Platform," Software Logistics, available at: https://blogs.sap.com/2017/03/29/setting-up-a-cts-enabled-transport-landscape-in-sap-cloud-platform, 22 pages (Mar. 29, 2017).

\* cited by examiner

CONFIGURATION MANAGEMENT IN A MULTISYSTEM ENVIRONMENT

FIELD

The present disclosure generally relates to management of configuration settings in multisystem environments. Particular implementations relate to an architecture for classifying configuration settings and maintaining configuration settings across multiple systems based on such classification.

BACKGROUND

Software systems, such as cloud systems, are often designed to have configuration settings that influence a system's behavior and allow adjustments to the system to suit different users' needs. These configuration settings may be set once in a system before the system is made available for use. Configuration settings may need to be tested before they are used. Testing may be done in a different system before the setting is used in a user system. Increasingly, such settings also need to be adapted during the lifetime/usage of the system, which can increase the testing needed. However, some settings may change so often that stringent testing before use is difficult or limiting. Other settings may never change. Further, a complex cloud environment may lead to a complex set of configuration settings, each with a different level of use, need for testing, importance, or rate of change. This increase in complexity leads to increased difficulty in maintenance activities for the configuration settings during lifecycle support of the software system. Thus, there is room for improvement in management of configuration settings.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for management of configuration settings in a multisystem environment. According to one method, a system, in a multisystem environment having at least a test system and a production system, each with a local copy of a configuration setting, may identify the type for the setting based on a type identifier for the setting. The system may maintain the setting based on the type. Maintaining the setting may include, for a first type, making a primary location for the setting the production system, where the setting is initialized and editable at the production system. Maintaining the setting may include, for a second type, separating the setting between the test system and the production system, such that the setting may not be transferred or read between the two systems and the first local copy is editable at the test system and the second local copy is editable at the production system. Maintaining the setting may include, for a third type, making a primary location for the setting the test system, where the setting is initialized and editable in the test system.

According to another method, a receiving system may receive a request to edit a setting, the setting having a type identifier. The receiving system may determine a maintenance rule for settings associated with the type identifier, where the maintenance rule determines how a value associated with the setting is maintained between a first system and a second system. The maintenance rules may include, for a first type, to initialize and maintain the setting in the second system. The maintenance rules may include, for a second type, to initialize and maintain the setting independently in both the first system and the second system. The maintenance rules may include, for a third type, to initialize and maintain the setting in the first system. This rule may further include not transferring the setting to the second system. The receiving system may allow or deny the request to edit the value of the setting in accordance with the determined maintenance rule based on the determined type identifier for the setting and whether the receiving system is the first system or the second system under the rule.

In a further method, a system in a multisystem environment may receive a request to change a setting. The system may obtain setting data describing the setting, which may include a primary location identifier for identifying a primary system of the setting in the multisystem environment. The system may compare its identifier to the primary location identifier for the setting. If the system is the same as the primary location for the setting, then the system may allow the setting to be changed in accordance with the received change request.

The present disclosure also includes computing systems and tangible, non-transitory computer readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

DETAILED DESCRIPTION

Example 1—Overview

Configuration settings for software are valuable tools to allow software to be customized for a particular system or environment, or for a user or customer, without hard-coding the settings directly into the software. Such configuration settings often need to be changed, but in a controlled manner to ensure correct software functioning and stability. Further, the ability to make changes may need to be limited to certain individuals, such as a system administrator or advanced user, or to certain resources external to the software, such as a data provider. Monitoring the changes to configuration settings is also important for ensuring correct software functioning and that any problems arising from a change can be corrected or the change undone.

Further, different instances of software may be implemented across different systems in a multisystem environment, each instance having a copy of the configuration settings. Managing the configuration settings between the different systems correctly can ensure more effective and timely software deployment or greater software availability, while lowering the cost of software maintenance. Thus, it can be important to have an effective architecture for managing configuration settings for software between systems.

The disclosed technologies facilitate configuration setting management in a multisystem environment. This is accomplished through a set of configuration setting types, into which a configuration setting may be categorized. Each type of configuration setting is programmatically managed between systems according to specific rules for that type in the system architecture.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 2—Multisystem Environment

Figure 1A:
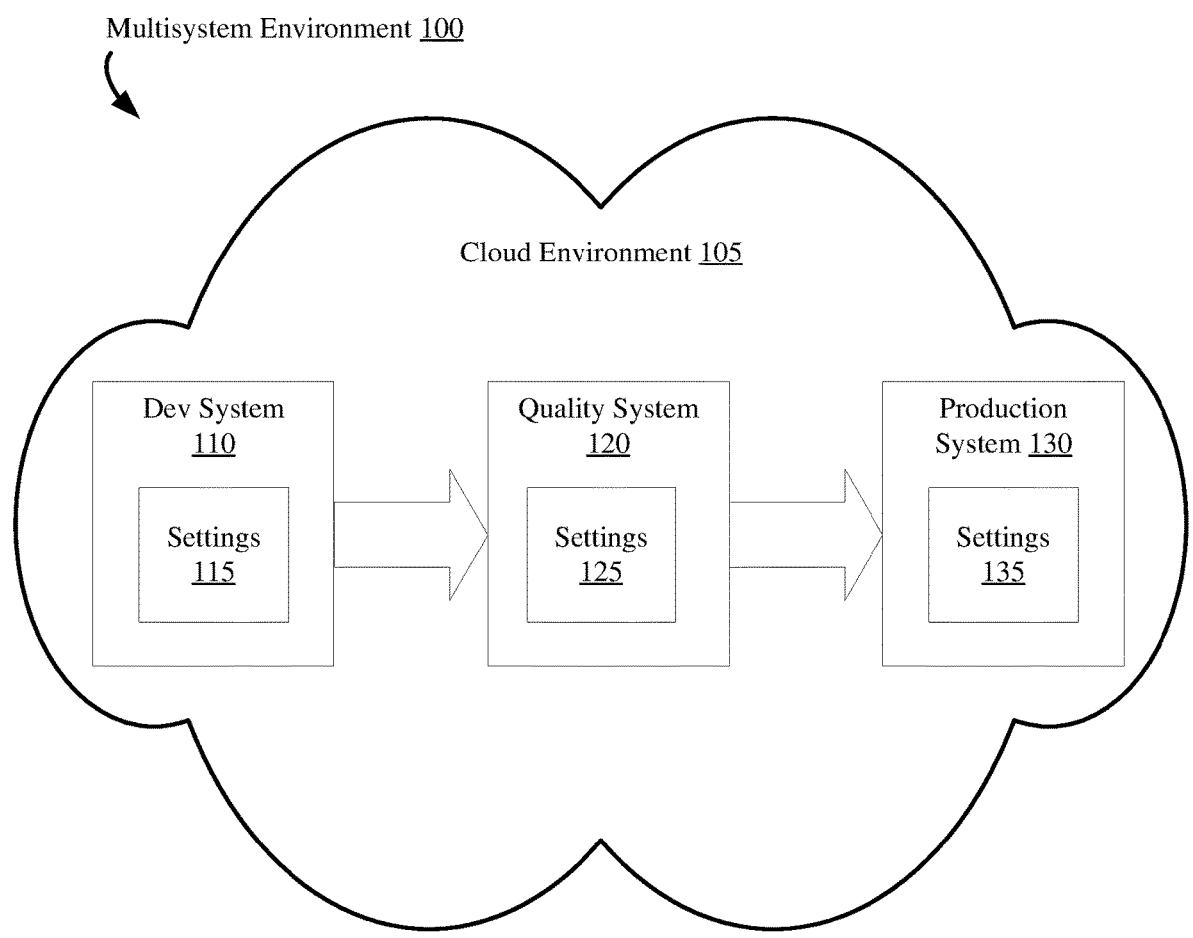
FIG. 1A is a schematic diagram depicting a multisystem environment transferring system information.

A multisystem environment with configuration settings is illustrated in FIG. 1A. A multisystem environment 100 may include a development system 110, a quality control system 120, and a production system 130. A multisystem environment 100 may include fewer systems or additional systems. Some or all of the systems in the multisystem environment may be in a cloud environment 105. One or more of the systems in the multisystem environment 100 may have configurations settings. The dev system 110 may have configuration settings 115; the quality system 120 may have configuration settings 125; the production system 130 may have configuration settings 135. Although the present disclosure generally proceeds with reference to two or more of a development system 110, a quality control system 120, and a production system 130, it should be appreciated that these labels are by way of example and for convenient presentation and that the systems in the multisystem environment 100 can include other types of systems which can be, more generally, first, second, third, etc., systems.

A system generally runs software or a set of software, which is generally accessible to a user, a customer, or an external system. A system may also run data storage, such as a database, or other features useful to execution of software. The configuration settings are generally used to control or customize the software on the system. A system may be a discrete computer, a set of networked computers, or a logical system on one or more computers (such as a partition).

The systems in a multisystem environment may be copies of each other, running separate instances of the same software. The configuration settings are generally used to configure the software to run correctly on the separate systems. The systems may be used as different versions of each other, each serving a different purpose, or as separate systems but otherwise the same. The development system 110 may be used for software development, allowing developers to run and test software. The software may then be transferred to the quality control system 120, where testers may run the software and test its functionality. Thereafter, the software may then be transferred to the production system 130, where it may be made widely available to users or customers. Generally, the development system 110 is for unstructured testing and code writing, the quality control system 120 is for structured testing, including both verification and validation, and the production system 130 is not used for testing and instead provides the current version of the software to end users.

Copying the software from one system to another system may be accomplished in several ways. In some instances, the entire system may be exported and placed on a different system. This could be done manually or as a scheduled process managed by software. In another instance, only a portion of the software or other features in a system may be exported to another system. This may be a formal process based around software versions and official releases, or it may be more informal based around, for example, testing needs (between testing systems), minor changes, or urgent fixes.

Figure 1B:
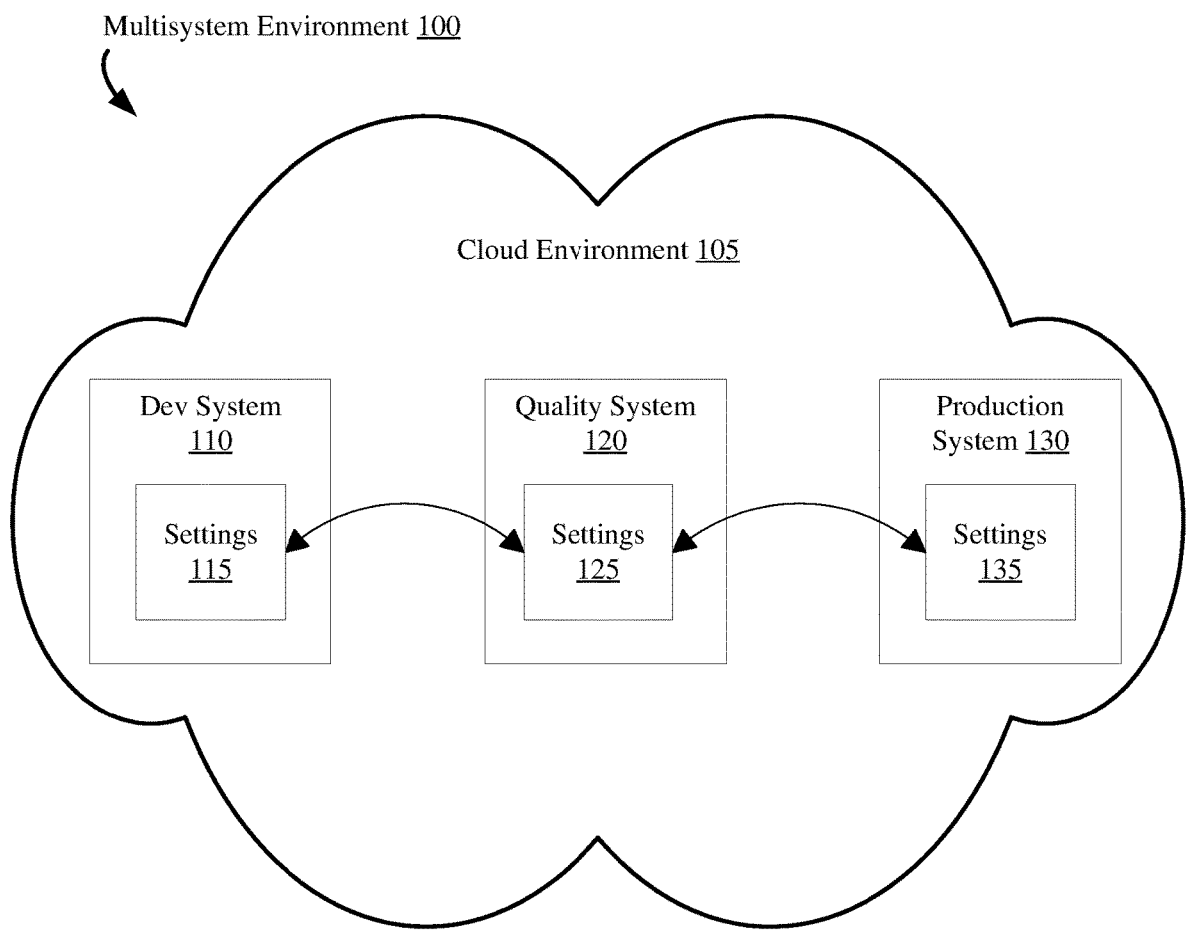
FIG. 1B is a schematic diagram depicting a multisystem environment transferring settings between systems.

In some scenarios, it may be desirable for configuration settings (or particular properties thereof, such as whether a setting is editable at a particular system or which system services as a primary or home system for the setting) to be accessible between the systems, as illustrated in FIG. 1B. In such cases, one or more configuration settings may be transferred from one system to another system without transferring other features of the system. In some instances, a configuration setting may be accessed from a different system to change the setting or a characteristic of the setting, or to lock/unlock a setting. The methods for managing such setting interaction between systems is further described herein.

Example 3—Settings

A system may have one or more configuration settings, also called settings. A setting may be a value or a variable used by the system during execution. Settings are generally consistent across the system, however, settings may vary within the system, or between different systems, based on a known factor or factors. For example, each user may have a separate set of settings, or each department of a customer may have separate settings. Settings may be modifiable by a user or users. In some scenarios, settings may only be changed by a technical user or administrator, or, in some cases, a separate external resource.

A setting may be used for determining control flow or logic flow, such as a threshold value for performing analysis. A setting may be used for data calculations or analysis, similar to a global variable, such as a constant value or conversion rate value. A setting may be used for system environment information, such as address or gateway information for an external resource or the number of attempts to make in communication before reporting failure.

A setting may have further characteristics beyond its value. A setting may be a particular type of setting; the type provides further information about the nature of the setting or how to use the setting based on the definition of the type. The type may also define some or all of the other characteristics a setting has or the values of some or all of those other characteristics. A setting may have a primary location, which may be the primary system that maintains the setting in a multisystem environment. A setting may also have an indicator for allowing or disallowing modification of the setting's primary location. A setting may also have a read/write lock, indicating if the setting may be read, or overwritten, both read and overwritten, or neither (for example, is inaccessible by a particular user or system). A setting may have any combination of these characteristics, and/or other characteristics not disclosed herein.

Example 4—Setting Storage

Settings are typically stored on each system in a multisystem environment. The setting may be the same setting, but with a local copy stored on some or all of the systems in a multisystem environment. The settings may be stored in a variety of ways that make them accessible for editing without restarting the software on the system. For example, the settings may be stored in a file, such as a text file. The settings may be stored in a registry, such as a system registry. The settings may be stored in a database on the system or accessible by the system.

Settings generally are stored with a name or identifier and the value of the setting. Further characteristics of the setting are also stored with the setting, such as a primary location of the setting. In one embodiment, the setting and its characteristics may be stored in a registry. A setting name may be stored as an identifier in the registry and other characteristics of the setting, such as the value, type, primary location, or editability indicator may be stored as subentries in the registry under the identifier. Each characteristic is linked to a corresponding setting and may have an identifier, such as a name, and a value.

In another scenario, a setting may be stored in a database. A setting may be stored as a row in a settings table, with a value in a column for a particular row ID identifying the setting and further columns providing characteristics of the setting. For example, the further columns may include the name of the setting, the value of the setting, the type of the setting, the primary location of the setting, or other characteristics associated with the setting. Further rows may store further settings, with their corresponding characteristics.

Example 5—Setting Types

Figure 2A:
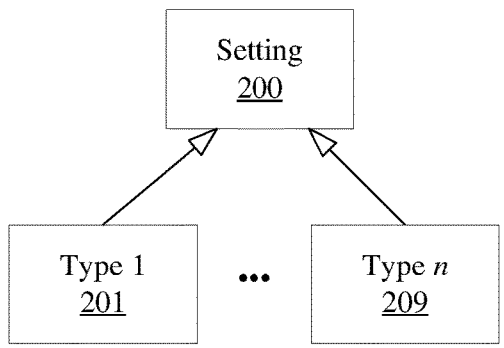
FIG. 2A is a diagram illustrating settings with setting types.

A setting may be defined as having a type, as illustrated in FIG. 2A. A setting 200 may be one type of setting from a set of types, such as Type 1 201 through Type n 209. Any number of types (n) may be defined. In some cases, settings may be implemented as data objects (e.g., instances of a class or composite data type). In such a scenario, Type 1 201 generalizes to Setting 200, as do all types through Type n 209. Thus, a setting of Type 1 201 will have all characteristics of Type 1 plus all characteristics of settings 200. For instance, setting 200 can represent a base class and types through Type n 209 can be derived classes.

In another implementation, a setting may be classified into a type (e.g., a class can implement all types, and a data member or variable can specify a type for a particular instance of the class). In this scenario, setting 200 may be categorized as Type 1 201 or any other type through Type n 209. Generally, a setting will be of only one type; however, in some embodiments a setting may be of more than one type.

Each type defines certain characteristics of the setting. The type may define the nature of the setting, such as if it is an environmental variable or a data calculation value. In one embodiment, the type defines how the setting is maintained, such as how it is managed between different systems in a multisystem environment, such as which systems, for example, may edit the setting or which system has primacy for the setting. The type may further determine if the setting can be transferred between systems or under what circumstances it may be transferred.

Figure 2B:
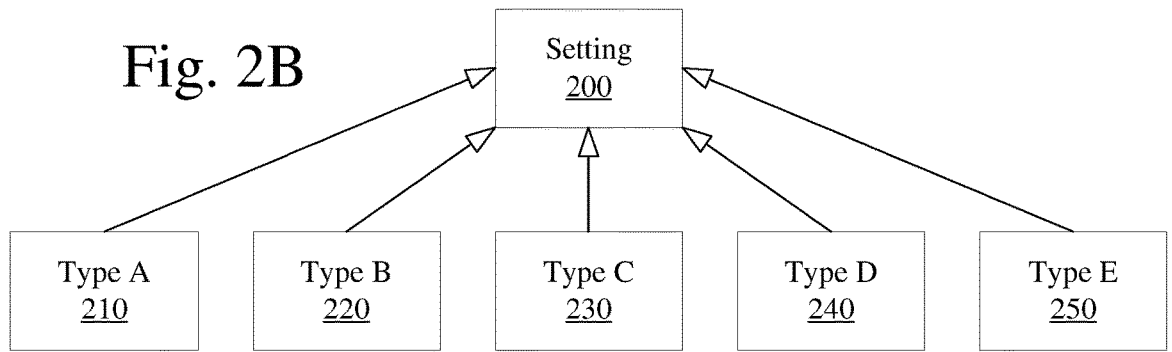
FIG. 2B is a diagram illustrating settings with specific setting types.

Specific types of settings may be defined as illustrated in FIG. 2B. A setting 200 may be of Type A 210, Type B 220, Type C 230, Type D 240, or Type E 250. Each of these types may be defined by how they behave between different systems. This may include in which system information specifying a type for a particular setting may be maintained. Maintenance of a setting may include changing the value of a setting and/or testing a setting. In one embodiment, maintenance of a setting may include read and write locks for the setting. In another embodiment, the type of setting may include information about the primary location of the setting, also known as the source or origin, and information indicating if the primary location may be changed for the setting. This information helps enable setting management across multiple systems by identifying if a setting in a given system may be changed or under what circumstances it can be changed.

Figure 2C:
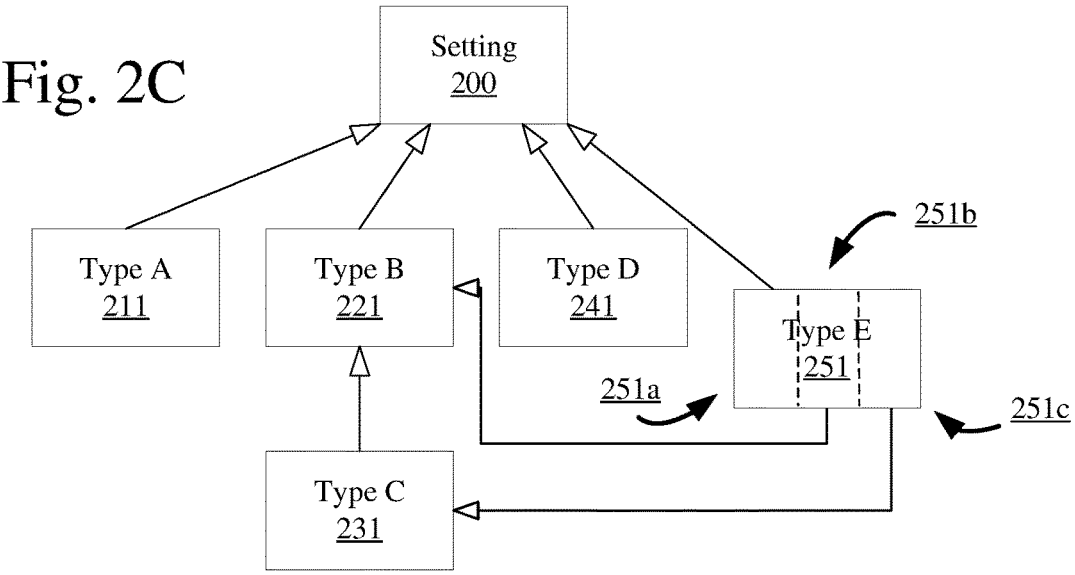
FIG. 2C is a diagram illustrating settings with specific setting types in an alternate configuration.

The types of settings may be interrelated, as illustrated in FIG. 2C. A setting 200 may be of Type A 211, Type B 221, Type C 231, Type D 241, or Type E 251, similar to FIG. 2B. However, different types may share characteristics or functionality while still being separate types. Type C 231 may generalize to Type B 221, which then generalizes to setting 200. In this scenario, Type C 231 has its own characteristics and functionality, such as primary location and modifiability of the primary location, but also has the additional characteristics and functionality as Type B 221. However, Type B 221 may not have any of the characteristics under Type C 231.

A type may be divided into different subtypes; Type E 251 may be divided into three subtypes 251*a*, 251*b*, 251*c*. Each subtype 251*a*, 251*b*, 251*c* has the same characteristics as Type E 251, but each may include different additional characteristics. For example, one subtype 251*a* may include no additional characteristics and so generalize to a setting 200. Another subtype 251*b* may generalize to Type B 221, and so have the characteristics of Type E and Type B. A third subtype 251*c* may generalize to Type C 231, and so have the characteristics of Type E, Type C, and also Type B 221 through Type C.

Although the present disclosure generally referrers to types having labels A-E, it should be appreciate that such labels are used merely for convenient presentation. That is, for example, properties of a Type A setting 211 could instead be associated with a setting having a label of Type B, or another identified (e.g., any value that serves as an identifier, such as a unique identifier, for the Type, including integer or string values).

Example 6—Primary Location of Settings

A setting may have a primary location, which may be based on the setting's type. The primary location is the system in the multisystem environment where the setting is maintained. This is generally a single system. Maintaining a setting may include changing or updating a setting, providing a copy of the setting to other systems, tracking changes to a setting, or preventing unauthorized changes to a setting. Maintaining a setting may generally refer to a setting that already exists, however, in some embodiments it may further include creating or initializing a setting. Initializing a setting may include defining a setting, assigning a value to a setting, defining characteristics for a setting or assigning values to characteristics for a setting, or allocating storage for a setting, such as creating a registry entry for the setting or an entry in a database table for the setting.

A setting's primary location may be the system where the setting can be changed. It may also be the system that is considered to have the current (or "true" or authoritative) value of the setting. For example, if an administrator or developer needed to know the current value of a setting (e.g. for use in software development, testing, or for use in a particular system), the primary location of the setting indicates from which system they should get the value, in case the values are different in different systems.

In some implementations, the setting may only be changed at the primary location; changes in other systems are prevented. In other implementations, the setting may be changed in other systems, but these changes may not be transferred to or overwrite the setting in the primary location. Further, these changes may also not be transferred to other systems in the multisystem environment. Also, in at least some cases, settings in systems that are not the primary location may be overwritten by the setting from the primary system, if the setting is transferred. Thus, the primary location may be used to determine the primary value and other characteristics of a setting between the different systems in the multisystem environment.

In some scenarios, the primary location of a setting may be able to be changed. For example, some types of settings may have their primary location change during their lifecycle, whereas other types of settings may not have their primary location change. The editability of the primary location may be indicated by a flag or other characteristic of the setting, and/or may be determined by the setting's type. Changing the primary location of a setting changes which system maintains (e.g. may change) the setting.

Example 7—Changing Setting Type

In some embodiments, the type of a setting may be changed. For example, a Type B setting may be changed to a Type C setting based on changes to the software during the lifecycle of the software. Generally, such a change may be done and be effective at the primary location for the setting, as determined by its current type. This is generally true for other characteristics of the setting as well. Once a setting's type has been changed, that change may (and, in some cases, will) be transferred to other systems with the setting in the multisystem environment and the setting will be treated as a setting of the new type.

In another embodiment, setting types may not be changed, or may only be changed through revisions to the software. This may prevent mistakenly manipulating a setting incorrectly (e.g. allowing changes at an incorrect system) by changing the setting type.

The ability to change a setting's type may be controlled by an indicator characteristic of the setting, such as a flag, stored as a characteristic of the setting. Further, the ability to change a setting's type may be limited to only certain users, such as a system administrator.

A setting type may also have subtypes. Subtypes may function similar to other setting types, eliminating the need to change the setting type. For example, Type E settings may have a subtype that behaves like Type B or Type C. Subtypes may also be used to further delineate additional characteristics of a setting type, without necessarily relating to other types. This may be useful when the additional characteristics only apply to a portion of settings within the type.

Example 8—Type A Settings

Figure 3A:
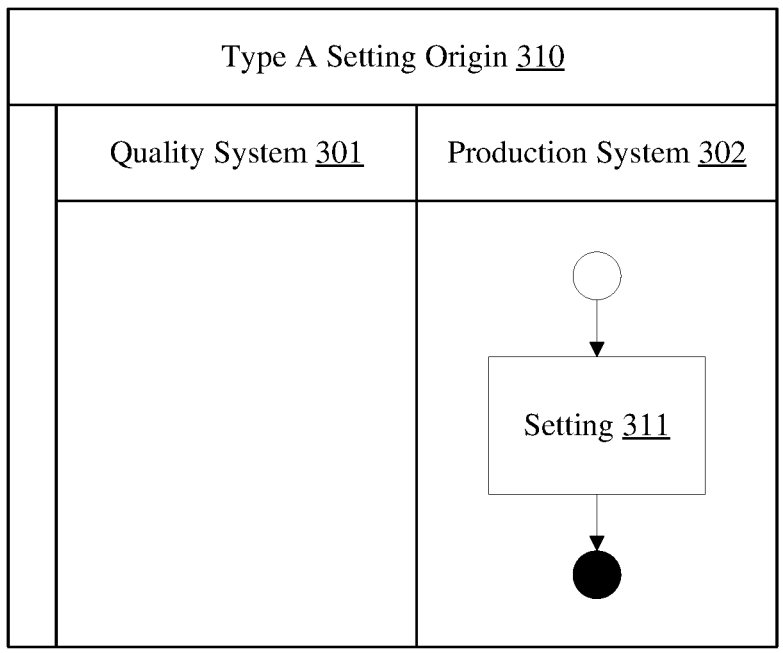
FIG. 3A is a flowchart illustrating the lifecycle of a primary system property of Type A settings.

FIG. 3A illustrates the primary location characteristic 310 of Type A settings. The primary location of a Type A setting 311 begins in a production system 302 and then ends in the production system. Thus, the primary location is always the production 302 system for Type A settings, and not a quality system 301 (or any other system in a multisystem environment). Further, the primary location does not change for Type A settings, as shown by the Type A setting primary location characteristic 310 beginning and ending under Production System 302 without ever changing.

The quality system 301 may have a copy of the Type A setting 311, however, this copy is not maintained. As a Type A setting, if the quality system 301 has a copy of the Type A setting 311, that copy should not be transferred to the production system 302. The quality system's 301 copy, however, may come from the Type A setting 311 in the production system 302. Alternatively, the copy in the quality system 301 may have a static value that is not pulled from the Type A setting 311 in the production system 302. Such a copy in the quality system may be useful or necessary to allow for testing of other features or settings in the quality system.

Figure 4A:
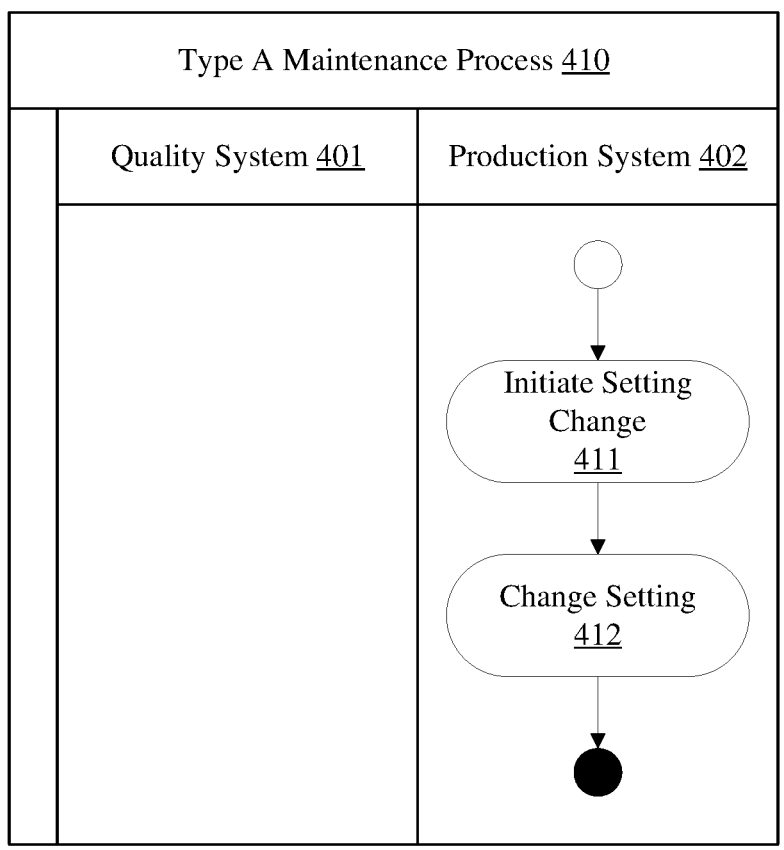
FIG. 4A is a flowchart illustrating a maintenance process of Type A settings.

FIG. 4A illustrates a maintenance process 410 for Type A settings. In a production system 402, a setting change may be initiated 411 for a Type A setting. Initiating the setting change 411 may include detecting that the setting is a Type A setting. It may also include retrieving the current value of the setting or prompting the user to provide a new value. This step 411 may further include ensuring the setting may be changed at this moment, such as that there is no write lock on the setting. Input is provided for the new value and the setting is changed to the new value at 412. The new value may come from user input, such as through a user interface, or from an external resource, such as a database, a batch update process, or a data feed from a data provider.

Type A settings are useful for values that may change frequently and so cannot go through testing or manipulation on other systems. For example, currency exchange rates or tax code mappings change frequently, and so may be categorized as Type A settings.

Example 9—Type B Settings

Figure 3B:
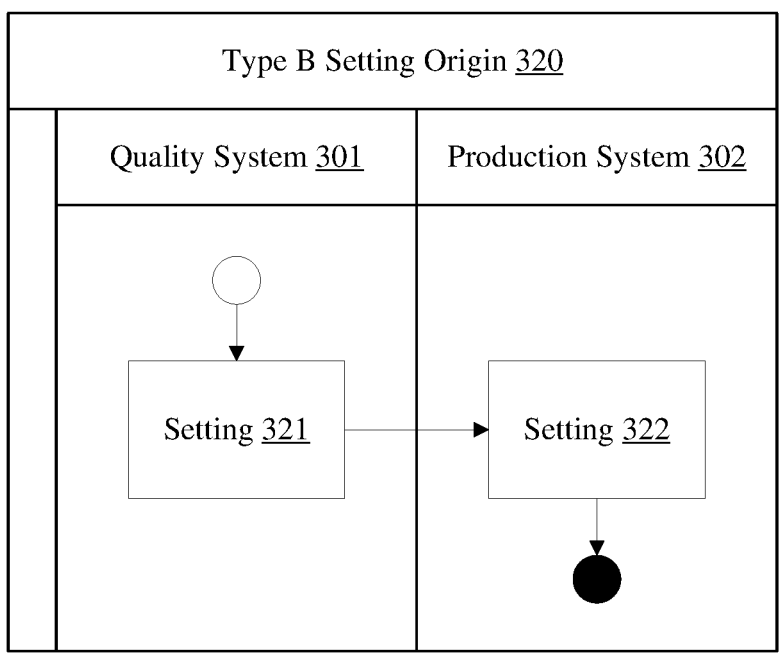
FIG. 3B is a flowchart illustrating the lifecycle of a primary system property of Type B settings.

FIG. 3B illustrates the primary location characteristic 320 of Type B settings. The primary location of a Type B setting 321 begins in the quality system 301 and then ends as Type B setting 322 in the production system 302. Thus, the primary location for a Type B setting is first the quality system 301 and later changed to the production system 302. Once a Type B setting's 321 primary location is changed to the setting 322 in the production system 302, the primary location does not change again. In some embodiments, the primary location in this scenario may no longer be editable.

Figure 4B:
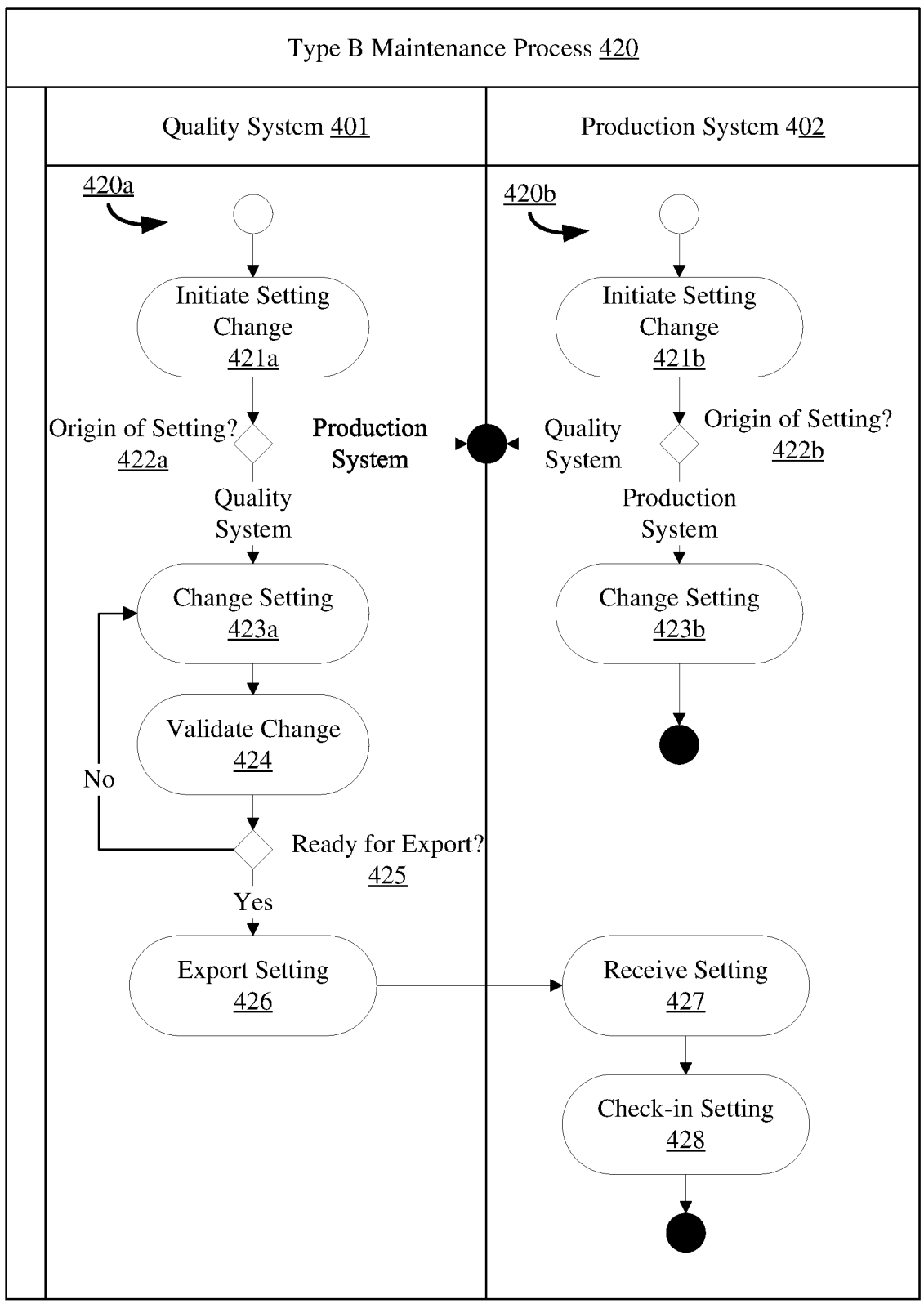
FIG. 4B is a flowchart illustrating a maintenance process of Type B settings.

FIG. 4B illustrates the maintenance process 420 for a Type B setting. A process 420a for changing a Type B setting may begin in the quality system 401. In the quality system 401, a setting change may be initiated 421a for a Type B setting. Initiating the setting change 421a may include detecting that the setting is a Type B setting. It may also include retrieving the current value of the setting or prompting the user to provide a new value. This step 421a may further include ensuring the setting may be changed at this moment, such as confirming that there is no write lock on the setting.

The primary location of the setting may also be obtained as part of initiating the setting change 421a. The primary location of the setting is then analyzed 422a to determine which system (401, 402) is the primary location. If the primary location is the production system 402, then the process 420a stops and no change is made. If the primary location is the quality system 401, then the process 420a proceeds, allowing the setting to be changed.

Input is provided for the new value and the setting is changed to the new value at 423a. The new value may come from user input, such as through a user interface, or from an external resource, such as a database, a batch update process, or a data feed from a data provider. The change to the setting may then be validated 424. Validation may include testing the software with the new setting, such as manual testing by a user or running testing scripts that simulate use of the software. Validating the change 424 may further include analyzing the results of the test to determine if the outcomes match those desired.

After validation, a determination 425 is made to export to the setting to another system. If the setting is not ready for export, such as the changes to the setting do not have the desired effect, then further changes may be made to the setting 423a. If the setting is functioning correctly, the setting may be exported 426 to the production system 402. Exporting the setting 426 may include immediately sending the setting to the production system 402 or writing the setting to a transfer file for transfer at a later time to the production system. The setting is received 427 by the production system 402 and stored. The setting is then checked-in 428, which includes changing the primary location of the setting from the quality system 401 to the production system 402.

Independent from the process 420a in the quality system 401, a process 420b for changing a Type B setting may begin in the production system 402. In the production system 402, a setting change may be initiated 421b for a Type B setting. Initiating the setting change 421b may include detecting that the setting is a Type B setting. It may also include retrieving the current value of the setting or prompting the user to provide a new value. This step 421b may further include ensuring the setting may be changed at this moment, such as confirming that there is no write lock on the setting.

The primary location of the setting may also be obtained as part of initiating the setting change 421b. The primary location of the setting is then analyzed 422b to determine which system (401, 402) is the primary location. If the primary location is the quality system 401, then the process 420b stops and no change is made. If the primary location is the production system 402, then the process 420b proceeds, allowing the setting to be changed. Input is provided for the new value and the setting is changed to the new value at 423b. The new value may come from user input, such as through a user interface, or from an external resource, such as a database, a batch update process, or a data feed from a data provider.

Type B settings are useful for values that may change frequently but require some testing or fine-tuning before being moved to a production environment. Additionally, Type B settings may be useful for settings that need testing before deployment, but will not change much once deployed. For example, planned order values, which define product requisitions that will be automatically generated by a system, may be categorized as Type B settings.

Example 10—Type C Settings

Figure 3C:
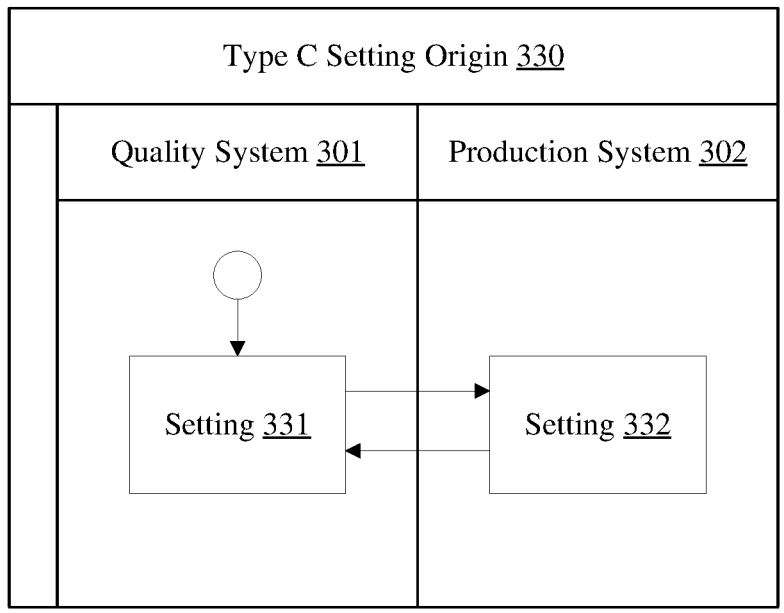
FIG. 3C is a flowchart illustrating the lifecycle of a primary system property of Type C settings.

FIG. 3C illustrates the primary location characteristic 330 of Type C settings. The primary location of a Type C setting 331 begins in the quality system 301. Thereafter, the primary location changes to the production system 302 with the corresponding Type C setting 332. The primary location may then transfer between the setting 332 in the production system 302 and the setting 331 in the quality system 301.

In general, the primary location is changed from the quality system 301 to the production system 302 when the setting is exported from the quality system to the production system. Thereafter, the primary location remains the production system 302 until the quality system 301 requests control of the setting from the production system; this is generally done because a change to the setting requires testing before being implemented in the production system. There is not a final primary location for a Type C setting, because Type C settings' primary location may transition between two systems in a multisystem environment. The primary location of a Type C setting is modifiable. The process for changing the primary location of a Type C setting is further detailed in the maintenance process 430 for a Type C setting.

FIG. 4B illustrates the maintenance process 430 for a Type C setting. A process 430a for changing a Type C setting may begin in the quality system 401. In the quality system 401, a setting change may be initiated 431a for a Type C setting. Initiating the setting change 431a may include detecting that the setting is a Type C setting. It may also include retrieving the current value of the setting or prompting the user to provide a new value. This step 431a may further include ensuring the setting may be changed at this moment, such as confirming that there is no write lock on the setting.

The primary location of the setting may also be obtained as part of initiating the setting change 431a. The primary location of the setting is analyzed 432a to determine which system (401, 402) is the primary location. If the primary location is the quality system 401, then the process 430a proceeds directly to changing the setting 434a. If the primary location is the production system 402, then the quality system 401 requests to check-out 433 the setting from the production system. This may include changing the primary location of the setting from the production system 402 to the quality system 401.

Once the setting is checked-out from the production system 402 to the quality system 401, the setting may be changed in the quality system and not changed in the production system. Input is provided for the new value and the setting is changed to the new value at 434*a*. The new value may come from user input, such as through a user interface, or from an external resource, such as a database, a batch update process, or a data feed from a data provider.

The change to the setting may be validated 435. Validation may include testing the software with the new setting, such as manual testing by a user or running testing scripts that simulate use of the software. Validating the change 435 may further include analyzing the results of the test to determine if the outcomes match those desired.

After validation, a determination is made 436 to export the setting to the production system 402. If the setting is not ready for export, such as the changes to the setting do not have the desired effect, then further changes may be made to the setting 434*a*. If the setting is ready for export, such as the setting is functioning correctly, the setting may be exported 437 to the production system 402. Exporting the setting 437 may include immediately sending the setting to the production system 402 or writing the setting to a transfer file for transfer at a later time to the production system. The setting is received 438 by the production system 402 and stored. The setting is then checked-in 439, which includes changing the primary location of the setting from the quality system 401 to the production system 402.

Independent from the process 430*a* in the quality system 401, a process 430*b* for changing a Type C setting may begin in the production system 402. In the production system 402, a setting change may be initiated 431*b* for a Type C setting. Initiating the setting change 431*b* may include detecting that the setting is a Type C setting. It may also include retrieving the current value of the setting or prompting the user to provide a new value. This step 431*b* may further include ensuring the setting may be changed at this moment, such as confirming that there is no write lock on the setting.

The primary location of the setting may also be obtained as part of initiating the setting change 431*b*. The primary location of the setting is analyzed 432*b* to determine which system (401, 402) is the primary location. If the primary location is the quality system 401, then the process 430*b* stops and no change is made. If the primary location is the production system 402, then the process 430*b* proceeds, allowing the setting to be changed. Input is provided for the new value and the setting is changed to the new value at 434*b*. The new value may come from user input, such as through a user interface, or from an external resource, such as a database, a batch update process, or a data feed from a data provider.

Type C settings are useful for values that may change but may need testing in the quality system 401, in some circumstance, before being used in the production system 402. In other circumstances the change may not need testing and can be made directly in the production system. For example, a balance sheet structure (e.g., a chart of accounts) or financial statement version (e.g. G/L accounts) may be defined for financial accounts and may vary by region, country, or business. The balance sheet definition or financial statement version may be a Type C setting because changes to a balance sheet definition or financial statement version may require extensive testing before being used in production as balance sheets or financial statements often have specific legal requirements for their structure. Balance sheet definitions or financial statement versions may require testing when they are changed to accommodate new legal requirements, or they may require testing when a new country or region is added to the system with a new balance sheet definition or financial statement version.

In another example, a minor change to a Type C setting can be made to improve the processing speed. If the setting change is not expected to have significant side effects, it can be made directly in the production system 402. In this case a change in the primary location of the Type-C setting may be not required. Thus, Type C settings are useful because they can allow the primary location of the Type C setting to vary depending on particular needs, yet can facilitate keeping the quality system 401 and the production system 402 synchronized, which previously was a cumbersome, error-prone manual processes of synchronizing the systems.

Example 11—Type D Settings

Figure 3D:
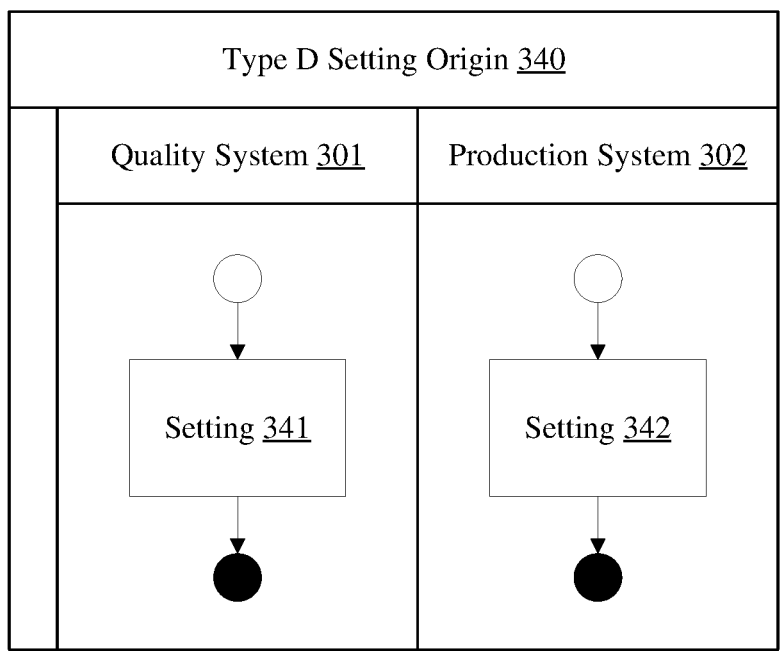
FIG. 3D is a flowchart illustrating the lifecycle of a primary system property of Type D settings.

FIG. 3D illustrates the primary location characteristic 340 of Type D settings. A Type D setting is maintained independently in each system of a multisystem environment. A Type D setting 341 has a primary location in the quality system 301 and, simultaneously, the Type D setting 342 also has a primary location in the production system 302. The setting 341 in the quality system 301 is the same setting as the setting 342 in the production system 302, but each may have a different value (including, in some cases, having a value in one system and not yet being assigned a value in another system).

In one implementation, the primary location is both the quality system 301 and the production system 302 at the same time. In another implementation, no primary location may be indicated for the setting. The primary location is generally not modifiable for a Type D setting because each setting is maintained independently in each system. However, the primary location for a Type D setting may be modified to add a new system in the multisystem environment, for example, if the primary location lists all systems in which the setting is found (or remove a system if a system is dropped from the multisystem environment).

Figure 4C:
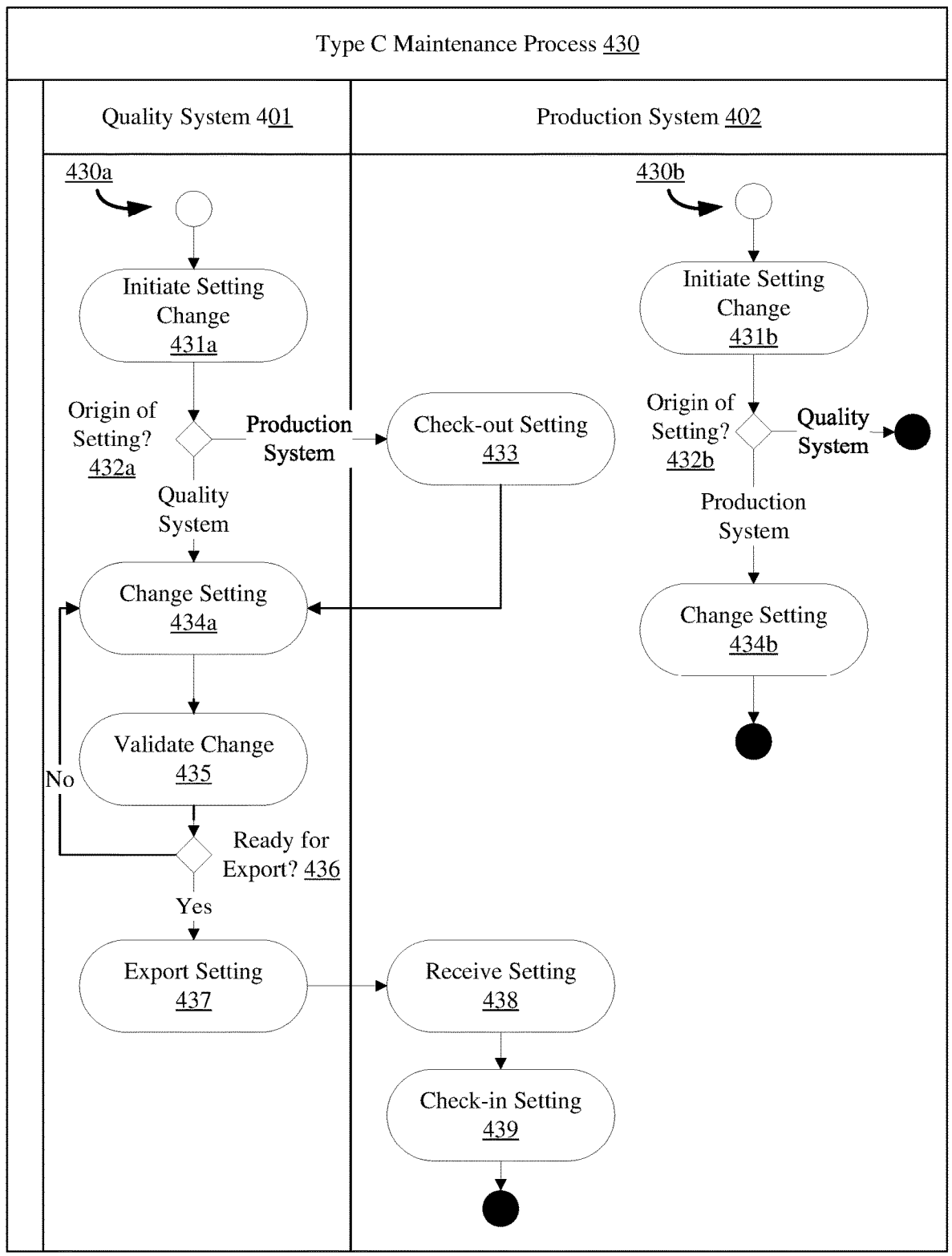
FIG. 4C is a flowchart illustrating a maintenance process of Type C settings.
Figure 4D:
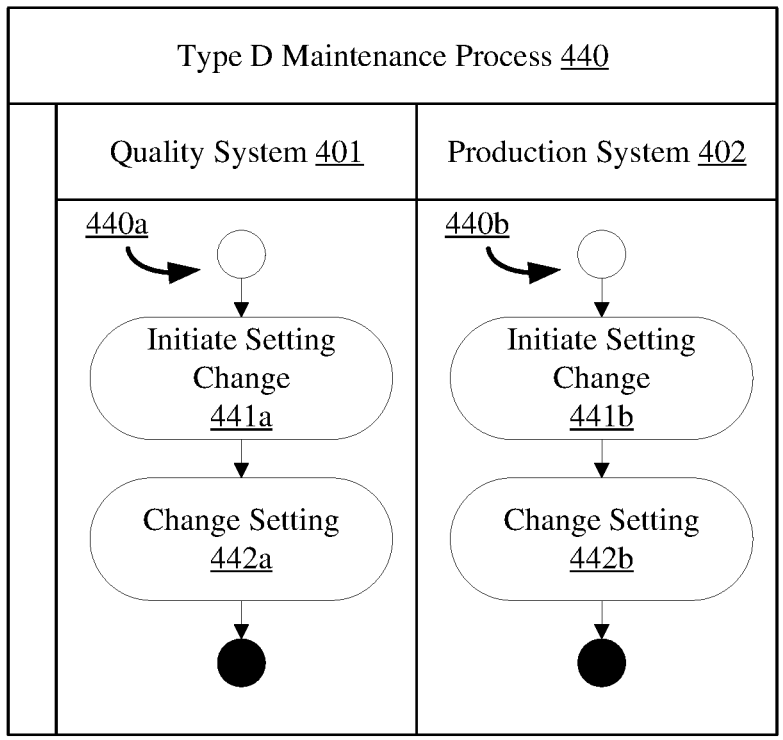
FIG. 4D is a flowchart illustrating a maintenance process of Type D settings.

FIG. 4D illustrates the maintenance process 440 for a Type D setting. A process 440*a* for changing a Type D setting may begin in the quality system 401. In the quality system 401, a setting change may be initiated 441*a* for a Type D setting. Initiating the setting change 441*a* may include detecting that the setting is a Type D setting. It may also include retrieving the current value of the setting or prompting the user to provide a new value. This step 441*a* may further include ensuring the setting may be changed at this moment, such as confirming that there is no write lock on the setting.

Input is provided for the new value and the setting is changed to the new value at 442*a*. The new value may come from user input, such as through a user interface, or from an external resource, such as a database, a batch update process, or a data feed from a data provider.

Independent from the process 440*a* in the quality system 401, a process 440*b* for changing a Type D setting may begin in the production system 402. In the production system 402, a setting change may be initiated 441*b* for a Type D setting. Initiating the setting change 441*b* may include detecting that the setting is a Type D setting. It may also include retrieving the current value of the setting or prompting the user to provide a new value. This step 441*b* may further include ensuring the setting may be changed at this moment, such as confirming that there is no write lock on the setting.

Input is provided for the new value and the setting is changed to the new value at 442b. The new value may come from user input, such as through a user interface, or from an external resource, such as a database, a batch update process, or a data feed from a data provider.

Type D settings are useful for values that generally will be different in each system. For example, environmental variables, such as an address for an external resource, are often different from system to system, and so may be categorized as Type D settings. Another example are network credentials, which may be necessary to properly access certain external systems, but may be different from one system to another system in the multisystem environment.

Example 12—Type E Settings

Figure 3E:
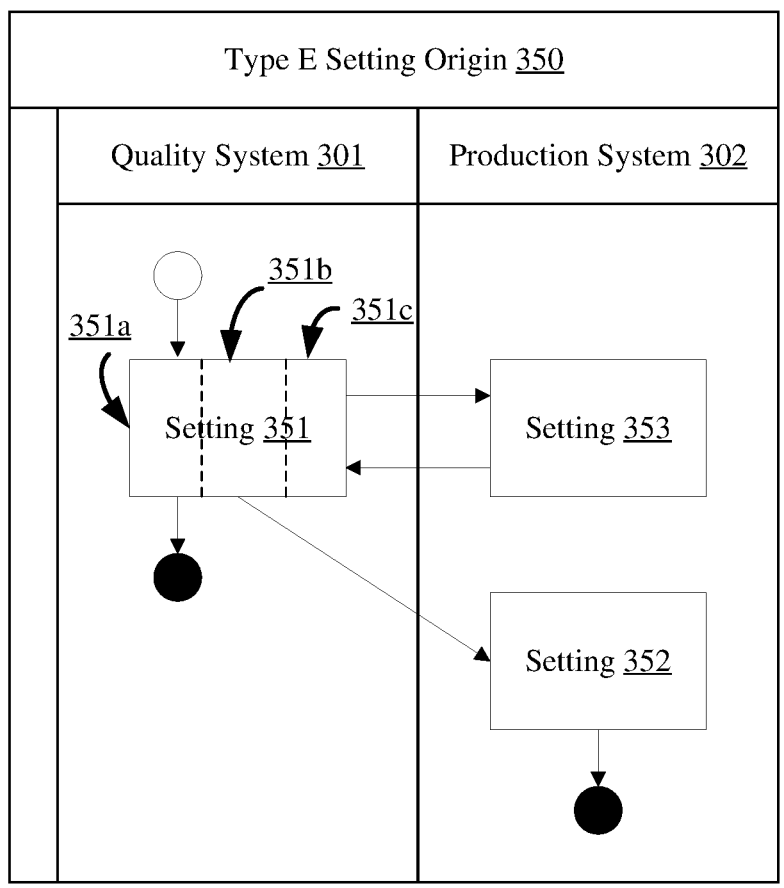
FIG. 3E is a flowchart illustrating the lifecycle of a primary system property of Type E settings.

FIG. 3E illustrates the primary location characteristic 350 of Type E settings. Type E setting 351 may be divided into subtypes 351a, 351b, 351c (which can be referred to respectively as first, second, and third subtypes). If Type E settings are not divided into subtypes, then Type E settings functions as described for the first subtype 351a. The primary location of the first subtype 351a of the Type E setting 351 begins in the quality system 301 and also ends in the quality system. Thus, the primary location may always be the quality system 301 for the first subtype 351a of the Type E setting 351, and not the production system 302 (or any other system in a multisystem environment). Further, the primary location does not change for the first subtype 351a, as shown by the Type E setting primary location characteristic 350 beginning and ending under the quality system 301 without ever changing for the first subtype 351a.

The first subtype 351a of Type E settings 351 can be useful for values that affect the quality 301 system but do not affect or are not relevant for the production system 302. For example, testing values, such as an address or location for test data inputs or a value indicating the number of times to run a test script, may be categorized as Type E settings because they are used in the quality system 301 but have no use in the production system 302. Demo values that are useful in providing a demonstration (or tutorial or template) of the system are another example.

The primary location of a second subtype 351b of the Type E setting 351 begins in the quality system 301 and then ends as a Type E setting 352 in the production system 302. Thus, the primary location for the second subtype 351b of Type E setting 351 is first the quality system 301 and is later changed to the production system 302. Once a second subtype's 351b primary location is changed to the setting 352 in the production system 302, the primary location does not change again. In some embodiments, the primary location in this scenario may no longer be editable.

This second subtype 351b of the Type E setting 351 is analogous to the Type B setting. This second subtype of Type E may be used, for example, when the first subtype 351a of Type E 351 becomes useful in the production system 302, and so is given characteristics similar to those of Type B to facilitate the setting's use in the production system.

The primary location of a third subtype 351c of the Type E setting 351 begins in a quality system 301. Thereafter, the primary location changes to the production system 302 with the corresponding Type E setting 353. The primary location may then transfer between the setting 353 in the production system 302 and the setting 351c in the quality system 301.

There is not a final primary location for the third subtype 351c of the Type E setting, because the third subtype's 351c primary location may transition between two systems in the multisystem environment. The primary location of the third subtype 351c of the Type E 351 setting is modifiable. This third subtype 351c of the Type E setting 351 is analogous to the Type C setting. The third subtype 351c of Type E setting 351 may be used, for example, when the first subtype 351a of Type E 351 becomes useful in the production system 302, and so is given characteristics similar to those of Type C to facilitate the setting's use in the production system but also allow for future testing in the quality system 301 of changes to the setting.

Figure 4E:
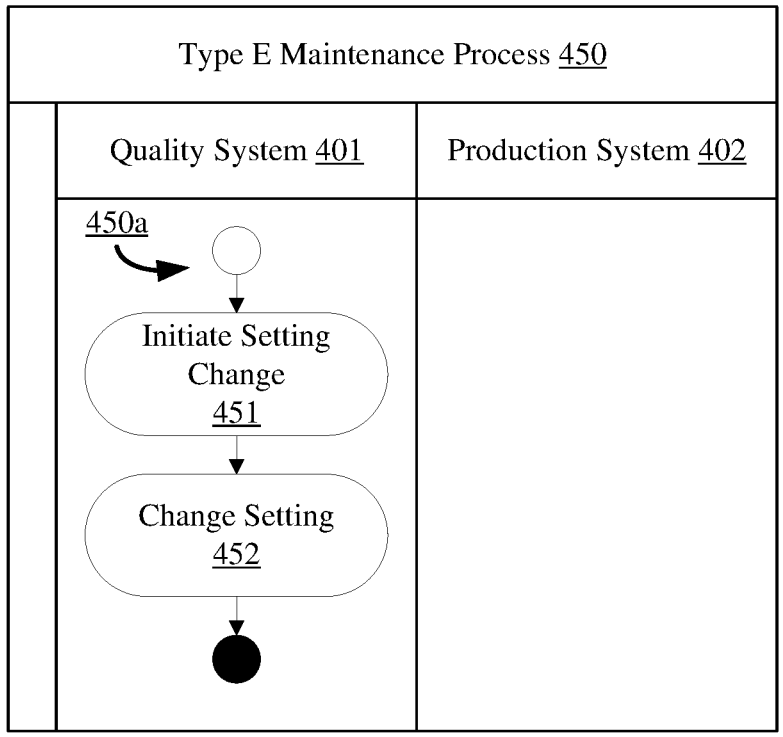
FIG. 4E is a flowchart illustrating a maintenance process of Type E settings.

FIG. 4E illustrates a maintenance process 450 for Type E settings. A maintenance process 450a begins in the quality system 401. The maintenance process 450a occurs in the quality system 401 because that system is the primary location for Type E settings. If Type E is divided into subtypes, this maintenance process 450a corresponds to the first subtype 351a of Type E setting 351.

In the quality system 401, a setting change may be initiated 451 for a Type E setting. Initiating the setting change 451 may include detecting that the setting is a Type E setting. It may also include retrieving the current value of the setting or prompting the user to provide a new value. It may further include ensuring the setting may be changed at the moment, such as that there is no write lock on the setting or other restriction preventing a change.

The new value for the setting is provided and the setting is changed to the new value at 452. The new value may come from user input, such as through a user interface, or from an external resource, such as a database, a batch update process, or a data feed from a data provider.

For the second subtype 351b of Type E setting 351, the maintenance process follows the maintenance process 420 for Type B, as shown in FIG. 4B and described in Example 9—Type B Settings.

For the third subtype 351c of Type E setting 351, the maintenance process follows the maintenance process 430 for Type C, as shown in FIG. 4C and described in Example 10—Type C Settings.

Example 13—System Setting Architecture

Figure 5:
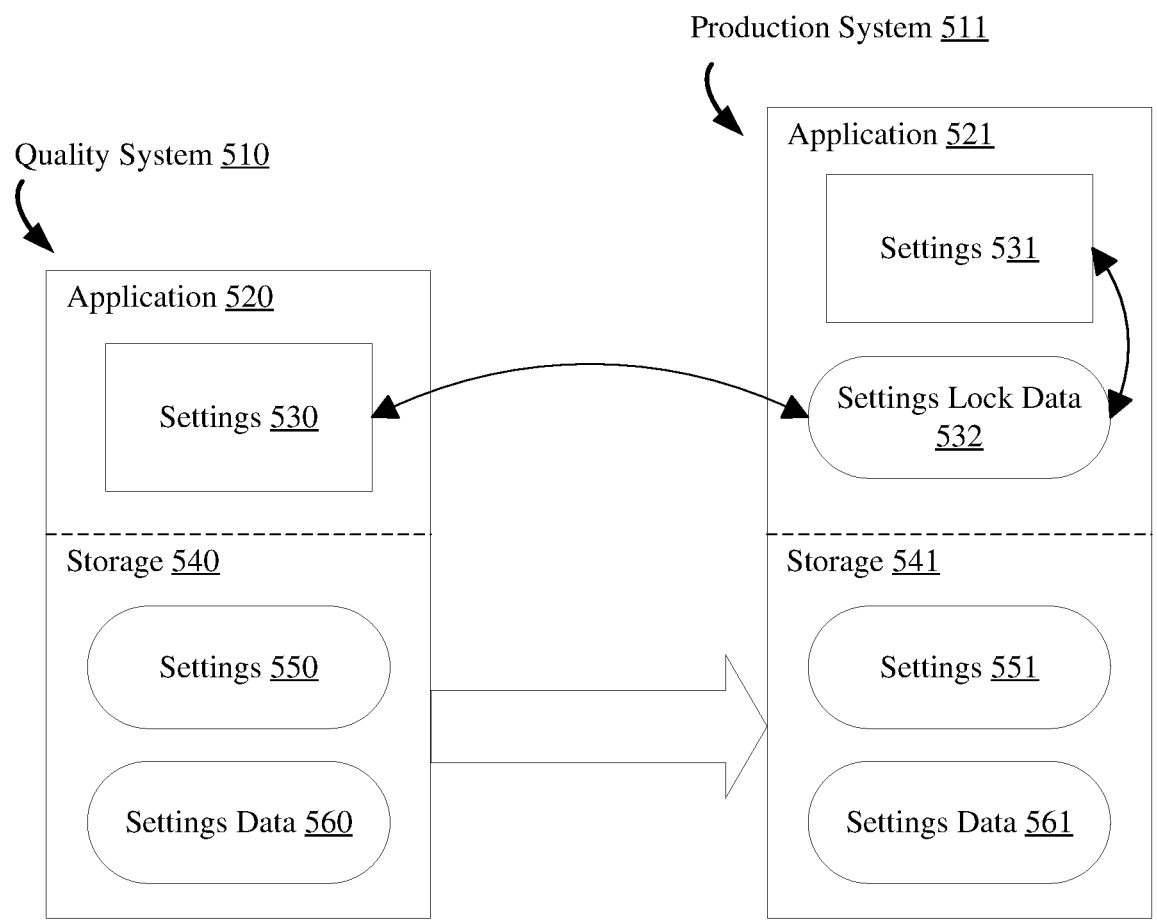
FIG. 5 is a schematic diagram depicting setting maintenance in a multisystem architecture.

The interaction of settings between systems is illustrated in FIG. 5. A quality system 510 may have two parts: an application 520 and storage 540. Within the application 520 exists settings 530 for use by the application. The settings 530 may include a setting identifier and a setting value for each setting, such as a copy of settings 550 from storage 540. Alternatively, the settings 530 may include the setting value and all characteristics for each setting, such as a copy of settings 550 and the settings data 560 from storage 540, or some relevant portion of the settings 550 and the settings data 560. Within the storage 540 exists settings 550 and settings data 560. The settings data 560 includes characteristics of the settings 550, such as the type or the primary location. The settings 530 in the application 520 may be obtained from the settings 550 in the storage 540.

A production system 511 may have two parts: an application 521 and storage 541. Within the application 521 exists settings 531 for use by the application and settings lock data 532 for indicating the current lock status of the settings. The settings lock data 532 may be for the entire collection of settings 531 or for each setting individually. The settings 531 may include a setting identifier and a setting value for each setting, such as a copy of settings 551 from storage 541.

Alternatively, the settings 531 may include the setting value and all characteristics for each setting, such as a copy of settings 551 and the settings data 561 from storage 541, or some relevant portion of the settings 551 and the settings data 561. Within the storage 541 exists settings 551 and settings data 561. The settings data 561 includes characteristics of the settings 551, such as the type or primary location. The settings 531 in the application 521 may be obtained from the settings 551 in the storage 541.

All or part of the storage 540 of the quality system 510 may be transferred to the storage 541 of the production system 511. This may be done as part of the export as described (e.g., in Examples 8-12) for each type of setting. Further, this transfer may be done for all settings or only for those settings approved for transfer. Approval for transfer may be contingent on validation of a changed setting, or on the type of setting. For example, Type A settings will never be transferred from the quality system 510 to the production system 511 (as described in Example 8—Type A Settings).

Further, the settings in the applications 520, 521 of each system 510, 511 may be transferred between each other as well. The settings 530 in the application 520 of the quality system 510 may request access to the settings 531 in the application 521 of the production system 511. This is accomplished through the settings lock data 532. If the setting is locked, the system 510 may not access the setting 531. In some embodiments, a locked setting 531 may still be read. A setting 531 may be locked based on its type. For example, a Type A setting in the production system 511 may not be overwritten by the quality system 510. In another example, a Type C setting may be overwritten by the quality system 510 based on the process described for Type C settings (Example 10—Type C Settings). If a change is determined to be allowable, the change may be made through the application 520, 521 or through the storage 540, 541. Coordination of the change is managed through the settings lock data 532.

In another embodiment, both systems 510, 511 may have settings lock data 532. In such a scenario, the quality system 510 may have settings lock data 532, which the production system 511 may access, similar to as previously described. This access may be based on the type of setting.

Example 14—Multiplicity of Systems

Descriptions herein for the functionality of the different setting types use two systems. However, these types may be used in multisystem environments with more than two systems. The functional relationship for a setting or a setting type may be between any two systems. For example, the functional relationship between the quality and production systems for a Type C (or any other type) setting may also be applied to a development system and quality control system, or between a fourth system and the production system, and so on.

Further, the quality and production systems may also represent a set of systems. For example, "quality system" as used in the descriptions may include two systems, such as a development and a quality control system, both relating to a production system as described. In this way, the different setting types can be useful for sets of systems in a multisystem environment, and are not limited to a one-to-one system interaction.

Example 15—System Sessions

A system in the multisystem environment may have multiple sessions of the software active. For example, a system may have more than one user access the system and each user then has a separate session in the software. Alternatively, each user may have a separate instance of the software. These separate sessions or instances may access the same settings on the system.

In another embodiment, the software on the system may be a multitenant application, having multiple tenants accessing the system, with each tenant having multiple users. Each tenant may have a separate set of settings, thus the settings may differ from tenant to tenant.

If the session is reading the setting, this is generally an available option. If the session is attempting to change the setting, then the session generally checks two things: the setting's primary location and if the setting is locked. Such a read/write lock may be implemented by a clash management system. If, based on the type of the setting, the setting may be changed in that particular system, then the session can proceed to check if the setting is locked; otherwise, in some scenarios, the change may not proceed. The session then checks in the setting is locked, which will indicate if another session is currently accessing the setting in the system. If so the setting is currently being accessed, such as being read or being changed, then the setting is locked and so cannot be changed. If the setting is not being accessed, then the change may proceed. Setting read/write locks may be implemented with other or additional clash management techniques.

Example 16—System Transport Embodiment

The disclosed technologies may be implemented within a software platform for configuration setting management during the lifecycle of the software. This also facilitates treatment of the settings as part of the software lifecycle. Examples of software platforms into which the disclosed technologies may be integrated are S/4 HANA CE or S/4 HANA OP, both from SAP SE, of Walldorf, Germany.

The disclosed technologies may be integrated in a basis layer of the software. This may include a definition of tables for the settings, including setting characteristics, and a maintenance view for maintaining the settings. Metadata may be used to control the status of the settings. The setting characteristics may be metadata. A table may be a control table for the settings. Such a control table may control the status of the settings, and may implement at least part of the configuration management as disclosed. In one implementation, the control table may be hosted on only one system in the multisystem environment. The control table may be accessible by other systems in the multisystem environment, and so function as a master control table. Clash management for individual settings may be implemented at the master control table, or on each system.

Setting transfer between systems may be implemented as a transport mechanism. For example, transport may be implemented using ABAP standard transport functionality. This may include disabling recording routines for the settings and implementing new routines. Such routines may write to an export file setting information for another system based on the setting's type or other characteristics. Then, the export file may be pushed to another system, where it is implemented and the setting changes are made based on the export file. Thus, in this scenario, setting management is accomplished by controlling what is written to export files of the system transport. For example, if a setting should not be transferred, it is not written to the transport request; if a setting should be transferred, it is written to the transport request with the appropriate data and characteristics that should be transferred to the other system.

Example 17—Further Example Processes

Figure 6A:
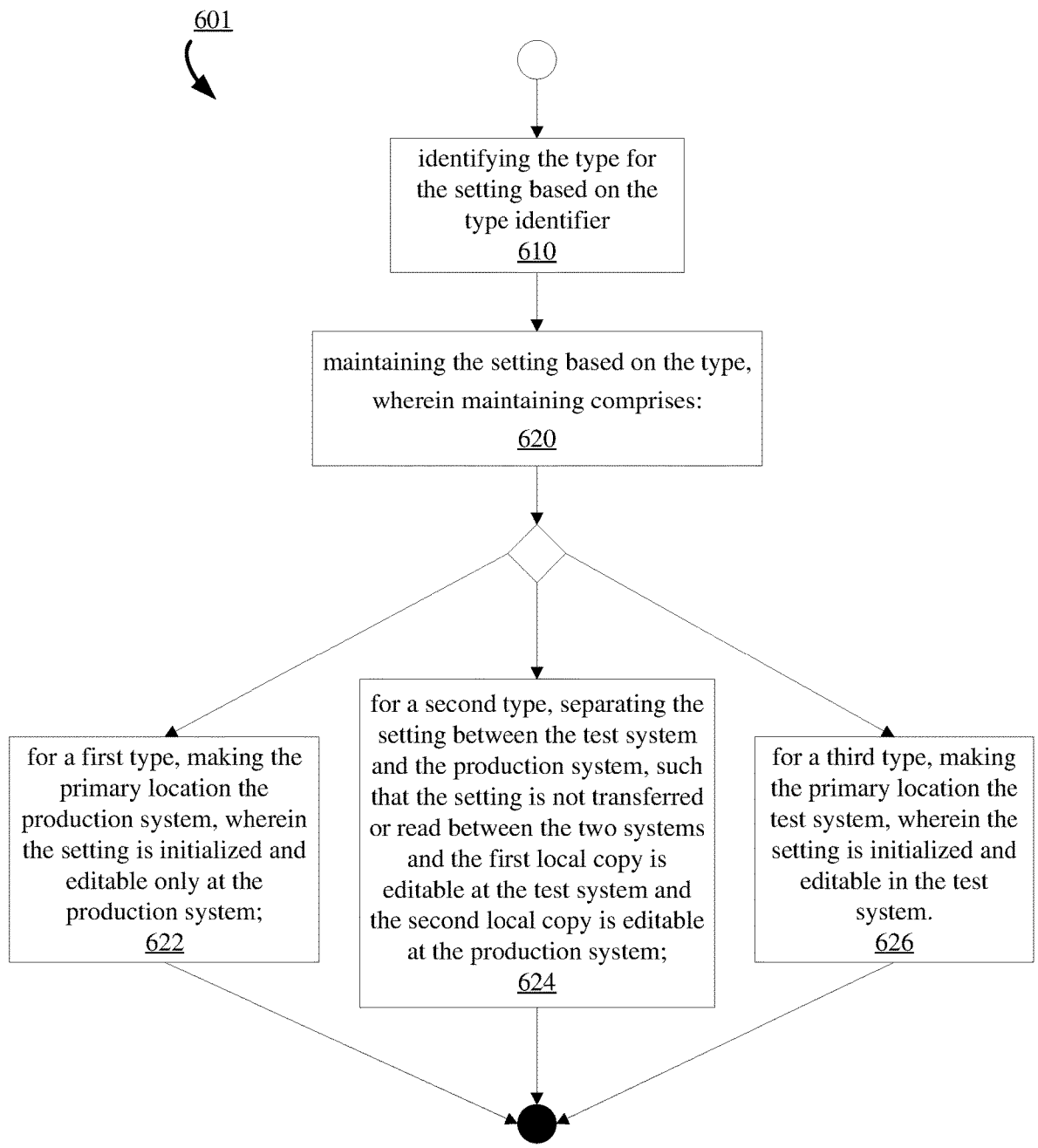
FIG. 6A is a flowchart illustrating a process for configuration management in a multisystem environment using setting type.

FIG. 6A illustrates operations 601 executable within a system for configuration settings management in a multi-system environment. The system may have a test system and a production system. The test system also has a setting, with a local copy of the setting at the test system and another local copy of the setting at the production system. At 610, a system identifies the type for the setting based on the type identifier. At 620, a system maintains the setting based on the type. Maintaining includes, for a first type 622, making the primary location the production system, where the setting is initialized and editable only at the production system. Maintaining includes, for a second type 624, separating the setting between the test system and the production system, such that the setting is not transferred or read between the two systems and the first local copy is editable at the test system and the second local copy is editable at the production system. Maintaining includes, for a third type 626, making the primary location the test system, where the setting is initialized and editable in the test system.

Figure 6B:
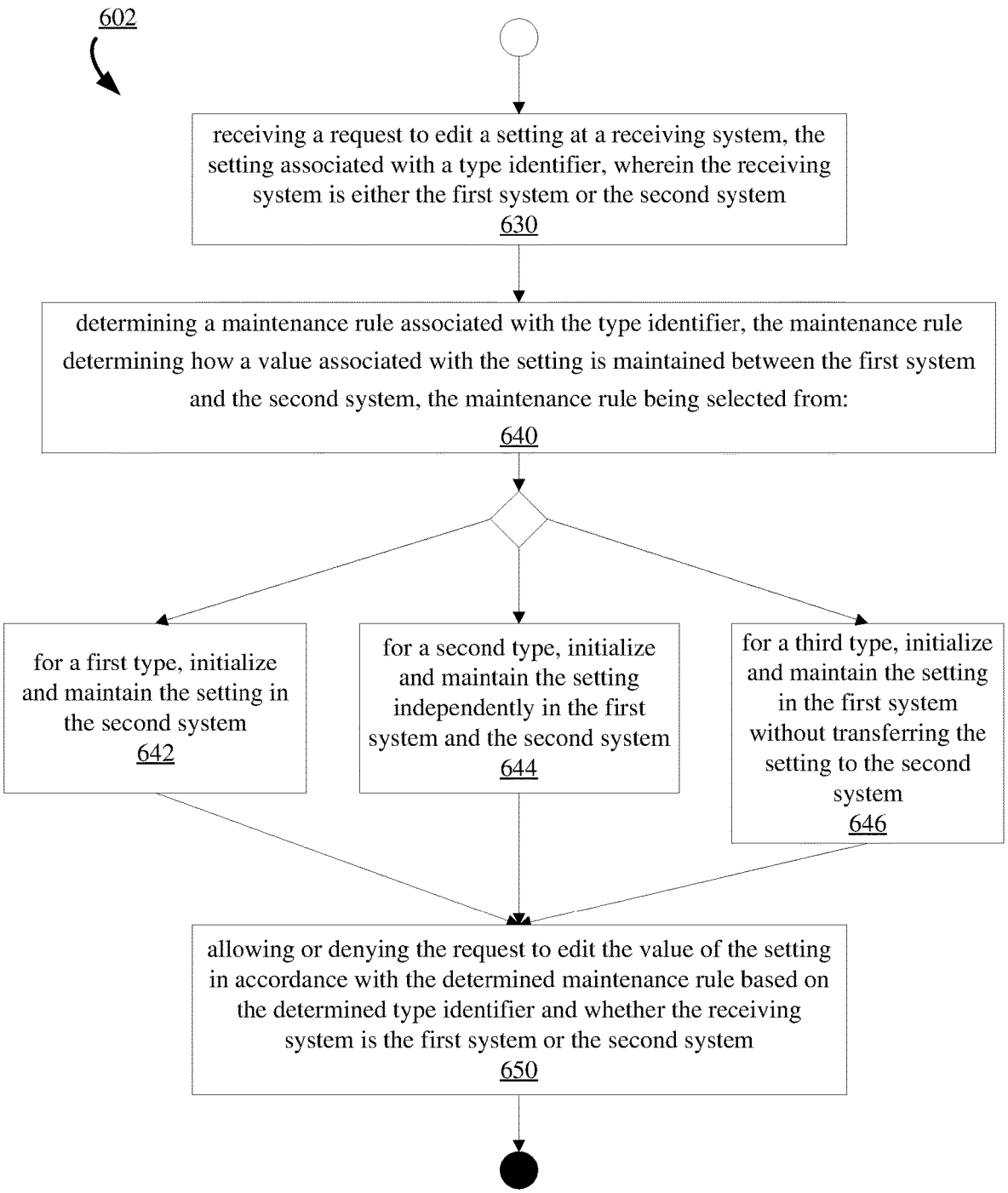
FIG. 6B is a flowchart illustrating an additional process for configuration management in a multisystem environment using setting type.

FIG. 6B illustrates computer-implemented instructions 602 for configuration settings management in a multisystem environment. At 630, a receiving system receives a request to edit a setting, the setting being associated with a type identifier, and the receiving system is either a first system or a second system. At 640, a receiving system determines a maintenance rule associated with the type identifier, where the maintenance rule determines how a value associated with the setting is maintained between the first system and the second system. The maintenance rule may be, for a first type 642, to initialize and maintain the setting in the second system. The maintenance rule may be, for a second type 644, to initialize and maintain the setting independently in the first system and the second system. The maintenance rule may be, for a third type 646, to initialize and maintain the setting in the first system without transferring the setting to the second system. At 650, the request to edit the value of the setting is allowed or denied in accordance with the determined maintenance rule based on the determined type identifier and whether the receiving system is the first system or the second system.

Figure 6C:
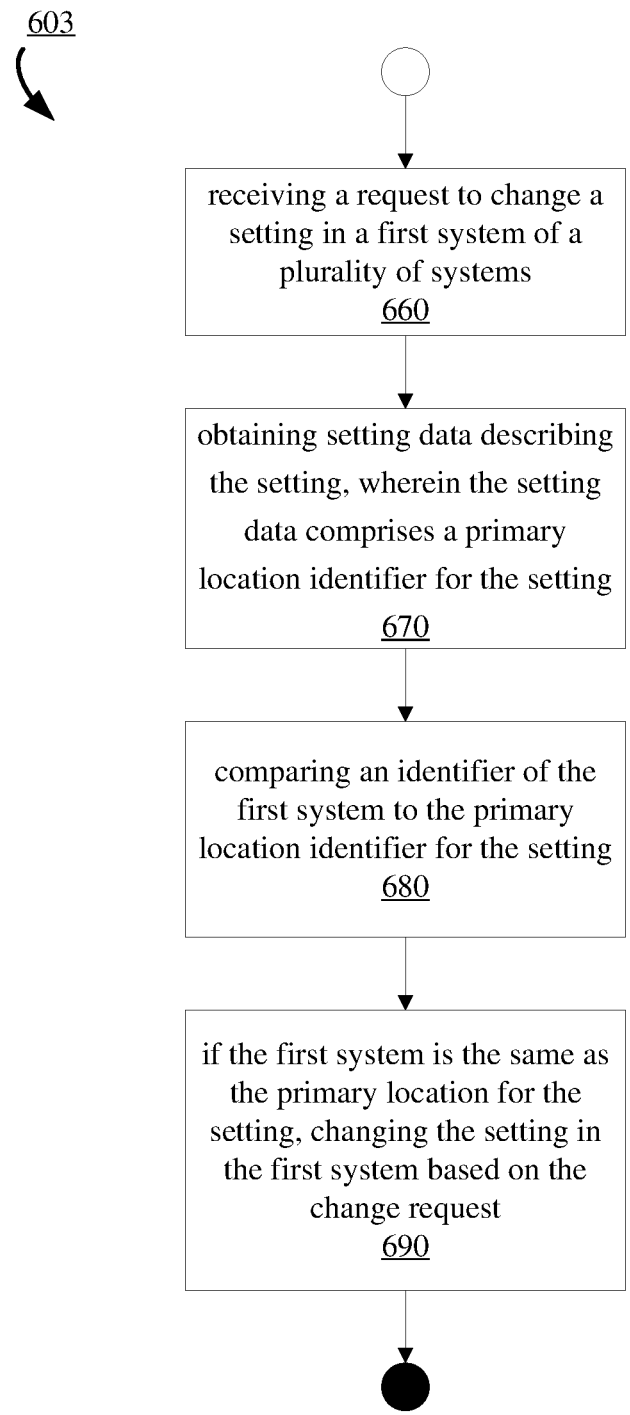
FIG. 6C is a flowchart illustrating a process for configuration management in a multisystem environment using primary location of the setting.

FIG. 6C illustrates a method 603 for configuration setting management in a multisystem environment. At 660, a system receives a request to change a setting in a first system in a plurality of systems. The first system obtains setting data describing the setting at 670, which includes a primary location identifier for identifying the primary system of the setting. The first system compares its identifier to the primary location identifier for the setting at 680. At 690, if the first system is the same as the primary location for the setting, then the first system changes the setting according to the change request. Changing the setting 690 may include changing the value of the setting or changing a characteristic of the setting, such as the primary location, the type, or lock status of the setting.

Example 18—Computing Systems

Figure 7:
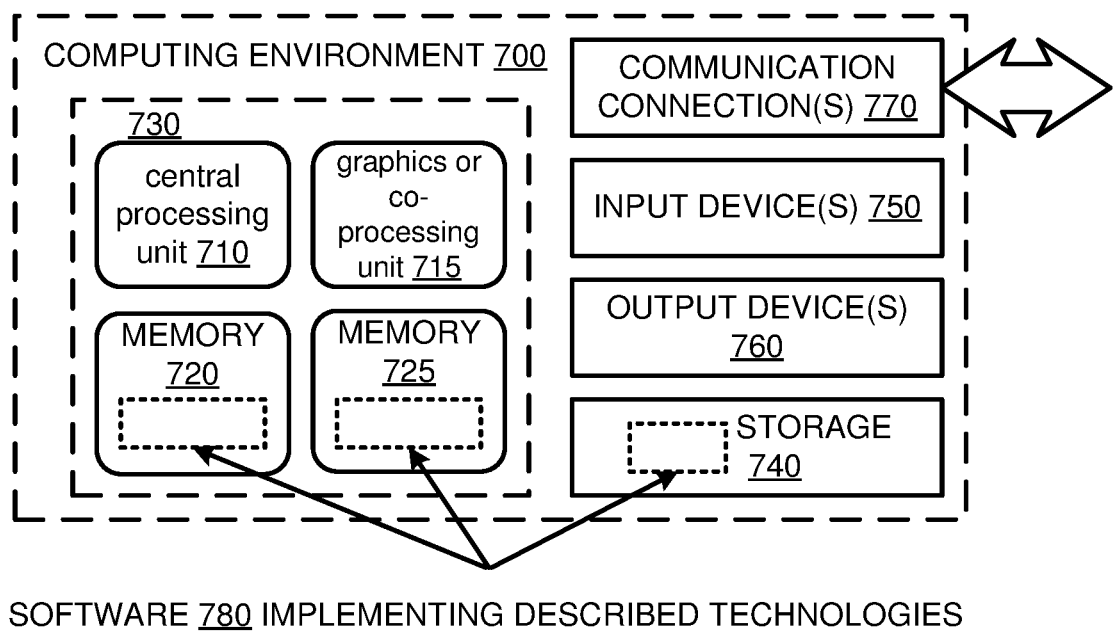
FIG. 7 is a diagram of an example computing system in which described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the processes of FIGS. 3A-E or FIGS. 4A-E, or the systems of FIGS. 1A-B or FIG. 5, or the settings of FIGS. 2A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store settings or settings characteristics, such as data associated with settings in the quality system in storage 540 or settings in the production system in storage 541 as shown in FIG. 5.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 19—Cloud Computing Environment

Figure 8:
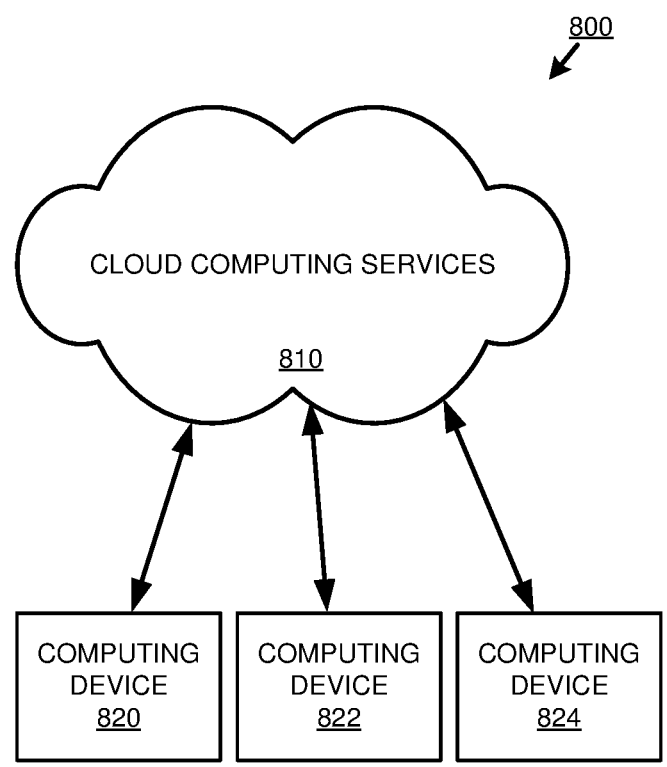
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 20—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A system for configuration management in a multisystem environment, the system comprising:
    a test system having a first local copy of a setting, wherein the setting has associated setting characteristics comprising a type identifier identifying a type of the setting and a primary location identifier identifying a primary system of the setting in the multisystem environment;
    a production system having a second local copy of the setting;
    one or more memories;
    one or more processing units coupled to the one or more memories; and
    one or more non-transitory computer readable storage media storing instructions that, when loaded into the memories, cause the one or more processing units to perform operations for managing the setting, comprising:
        identifying the type for the setting based on the type identifier from a plurality of setting types;
        maintaining the setting based on the type, wherein maintaining comprises:
            for a first type, making the primary location identifier indicate the production system, wherein the setting is initialized and editable only at the production system;
            for a second type, separating the setting between the test system and the production system, such that the setting is not transferred or read between the two systems and the first local copy is editable at the test system and the second local copy is editable at the production system; and
            for a third type, making the primary location identifier indicate the test system, wherein the setting is initialized and editable in the test system.

2. The configuration management system of claim 1, wherein the maintaining further comprises:
    for a fourth type, making the primary location identifier indicate the test system when the production system does not yet have the setting, wherein the setting is initialized and editable in the test system; and transferring the setting to the production system and making the primary location identifier indicate the production system, wherein the setting is editable in the production system and only readable by the test system.

3. The configuration management system of claim 2, wherein the maintaining further comprises:
    for a fifth type, wherein the fifth type comprises the fourth type, further comprising: receiving a request from the test system for access to the setting; locking the setting in the production system; transferring the setting to the test system; making the primary location identifier indicate the test system, wherein, while the setting is locked in the production system, the setting is editable in the test system and only readable in the production system; unlocking the setting in the production system; transferring the setting to the production system from the test system; and changing the primary location identifier of the setting to indicate the production system.

4. The configuration management system of claim 1, wherein the type identifier of the setting is editable.

5. One or more non-transitory computer-readable storage media storing computer-executable instructions for causing a computing system to perform configuration management between a first system and a second system, the processing comprising:
    receiving a request to edit a setting at a receiving system, the setting associated with a setting characteristic comprising a type identifier, wherein the receiving system is either the first system or the second system;
    determining a maintenance rule associated with the type identifier, the maintenance rule determining how a value associated with the setting is maintained between the first system and the second system, the maintenance rule being selected from:
        for a first type, initialize and maintain the setting in the second system;
        for a second type, initialize and maintain the setting independently in the first system and the second system;
        for a third type, initialize and maintain the setting in the first system without
    transferring the setting to the second system; and
    allowing or denying the request to edit the value of the setting in accordance with the determined maintenance rule based on the determined type identifier and whether the receiving system is the first system or the second system.

6. The one or more non-transitory computer-readable storage media of claim 5, wherein the maintenance rule is further selected from:
    for a fourth type, initialize and maintain the setting in the first system while the second system does not have the setting, transfer the setting to the second system, and maintain the setting in the second system.

7. The one or more non-transitory computer-readable storage media of claim 6, wherein the maintenance rule is further selected from:
    for a fifth type, the fifth type comprising the fourth type, further comprising:
        maintain the setting in the second system, transfer the setting to the first system and lock the setting in the second system to prevent maintenance of the setting in the second system, transfer the setting back to the second system from the first system, and unlock the setting in the second system allowing maintenance in the second system.

8. The one or more non-transitory computer-readable storage media of claim 5, wherein the type identifier of the setting is editable.

9. A method for configuration management in a multisystem environment, the method comprising:
- receiving a request to change a setting in a first system of a plurality of systems;
- obtaining setting metadata describing the setting, wherein the setting metadata is different from the setting and the setting metadata comprises a primary location identifier for the setting;
- comparing an identifier of the first system to the primary location identifier for the setting; and
- if the identifier of the first system is the same as the primary location identifier for the setting, changing the setting in the first system based on the change request.

10. The method for configuration management of claim 9, further comprising:
- if the identifier of the first system is not the same as the primary location identifier for the setting, preventing the change to the setting in the first system.

11. The method for configuration management of claim 9, further comprising:
- if the identifier of the first system is not the same as the primary location identifier for the setting, changing the setting in the first system based on the change request and preventing the setting from being transferred to other systems in the plurality of systems.

12. The method for configuration management of claim 9, further comprising:
- if the identifier of the first system is the same as the primary location identifier for the setting, transferring the setting from the first system to a second system of the plurality of systems.

13. The method for configuration management of claim 12, further comprising:
- after transferring the setting from the first system to the second system, updating the primary location identifier of the setting to an identifier of the second system.

14. The method for configuration management of claim 9, further comprising:
- if the identifier of the first system is not the same as the primary location identifier for the setting, requesting access to the setting from a second system, wherein the second system is the primary location;
- if authorized by the setting metadata, changing the primary location identifier to the identifier of the first system;
- changing the setting in the first system based on the change request;
- transferring the changed setting to the second system; and
- changing the primary location identifier from the identifier of the first system to an identifier of the second system.

15. The method for configuration management of claim 14, further comprising:
- testing the changed setting in the first system, wherein testing continues until the changed setting is ready for transferring.

16. The method for configuration management of claim 9, wherein the setting metadata further comprises a type identifier identifying a type of the setting.

17. The method for configuration management of claim 16, wherein the primary location is determined according to the type.

18. The method for configuration management of claim 16, wherein the editability of the primary location identifier is determined by the type.

19. The method for configuration management of claim 16, wherein the type identifier is editable.

20. The method for configuration management of claim 16, wherein the setting metadata further comprises a subtype identifier corresponding to the type identifier, for identifying a subtype of the setting.

* * * * *